March 1, 1966 J. E. RAMSEY 3,238,519
COMBUSTIBLE GAS DETECTOR CIRCUIT
Filed March 13, 1963
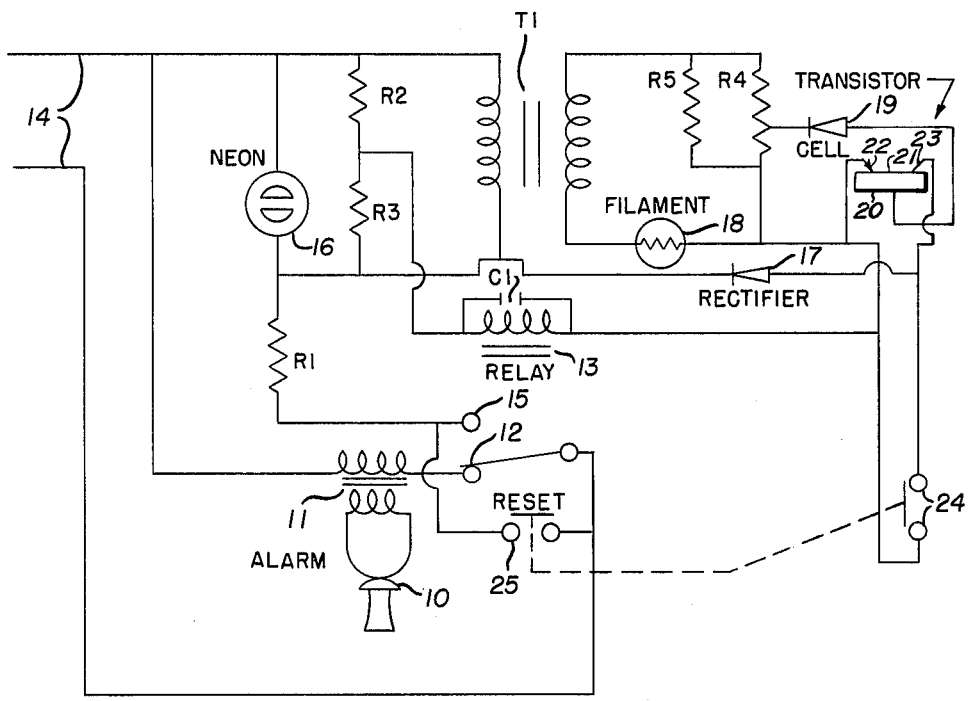
INVENTOR.
JAMES E. RAMSEY
BY
ATTORNEY United States Patent Office 3,238,519
Patented Mar. 1, 1966

3,238,519
COMBUSTIBLE GAS DETECTOR CIRCUIT
James E. Ramsey, 111 Aiken Road, New Castle, Pa.
Filed Mar. 13, 1963, Ser. No. 264,813
2 Claims. (Cl. 340—237)

This invention relates to a gas detector such as useful in determining the presence of objectionable various gases in homes, schools, factories and other places.

The principal object of the invention is the provision of a gas detector that will quickly and accurately detect the presence of an objectionable gas or gases and actuate an alarm.

A further object of the invention is the provision of a gas detector that includes a circuit arranged for fail-safe operation.

A further object of the invention is the provision of a gas detector that will readily detect any of a number of inflammable gases such as hydrogen, carbon monoxide or the paraffin series.

A still further object of the invention is the provision of a relatively simple and trouble-free gas detector wherein the components are arranged to utilize the temperature variance inherent in each to compensate for or nullify each other to achieve output stability under normal climatic variations.

The gas detector disclosed herein comprises a novel combination of actuating and responsive instruments in a simple trouble-free cricuit utilizing as a detector a platinum filament in a suitable circuit supervised by a silicon solar cell responsive to the change in color of the platinum filament as occurs when inflammable gases are present. The gas detector avoids the use of a flame which has heretofore been used in many gas detectors known in the art it further avoids the reliance upon the change in resistance in a filament-like member responsive to the presence of gases such as is sometimes referred to as a Wheatstone bridge.

In the gas detector disclosed herein the radiant emission of the platinum filament used as a detector is utilized to gate a transistor which in turn controls a relay in an alarm circuit. Thus, a gas detector is disclosed which avoids the uncertain operating characteristics of the gas detectors heretofore known in the art as well as avoiding the undesirable open flame often thought necessary.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

The figure is a schematic diagram of the gas detector including the component parts and electrical circuitry therefor.

By referring to the drawing, it will be seen that a gas detector has been disclosed which comprises an alarm 10 and an energizing transformer 11 therefor which is connected in series with normally open contacts 12 of a relay 13 and to a power supply line 14. Normally closed contact 15 of the relay 13 is connected in series with a resistor and a neon bulb 16. The resistor R1 has a rate of 2,000 ohms, 5 watts. A control circuit is tapped off the neon bulb 16 acts as a voltage limiter and stabilizes the voltage to the control circuit so that the output voltage is substantially the same. The voltage limiter, therefore, gives a constant voltage output for an input voltage which exceeds a predetermined value. The control circuit includes a transformer T1, a condenser C1 and a silicon rectifier 17. The condenser C1 is rated at 10 mf. at 25 volts. Resistors R2 and R3 of 4500 ohms and 700 ohms respectively at 5 watts are included in the control circuit and the relay 13 is tapped into the circuit between the resistors R2 and R3 with the condenser C1 connected across the windings of the relay 13. A platinum filament detector 18 is connected in place with a 1 ohm resistor and a parallel connected 1 ohm resistor R5 and the secondary of the transformer T1. The transformer T1 produces 2.5 volts on its secondary at 9 amps. A sensitivity adjustment R4 is adjusted just above the voltage of a silicon solar cell 19 with which it is connected. The silicon solar cell 19 is also connected with the base electrode 20 of a transistor 21 and the voltage of the silicon solar cell is sufficient to bias the base 20 of the transistor 21 to allow it to conduct and thereby energize the relay 13 which is connected to the emitter electrode 22 of the transistor 21. The collector electrode 23 of the transistor 21 is connected with the rectifier 17 and a pair of normally open reset terminals 24 of a reset mechanism of the spring return switch type which also includes secondary terminals 25 in the circuit to the normally open terminals 12 of the relay 13.

The platinum filament detector 18 is positioned in a loaction to observe a supervised area such as duct work or a room or the like and the silicon solar cell 19 is positoned adjacent thereto so as to be able to supervise the platinum filament detector 18. Normal adjustment of the sensitivity adjustment R4 permits the voltage of the silicon solar cell 19 to bias the base electrode 20 of the transistor 21 to allow it to conduct and thereby energize the relay 13. At such time as a combustible gas is present, the filament of the detector 18 will glow brighter relatively speaking and its increased radiation will be detected by the silicon solar cell 19 thereby generating voltage nullifying the bias voltage to the base electrode 20 of the transistor 21 which will thereupon cease to conduct or gate, causing the relay 13 to drop out and the alarm 10 to be energized, as illurstrated in the schematic drawing.

Those skilled in the art will observe that if the platinum filament of the detector 18 should burn out the transistor 21 would cease to conduct and the alarm 10 would again be energized. If a moderate short should occur in the control circuit or if the supply voltage is reduced the neon bulb 16 will be extinguished thereby providing a positive indication of the inoperation of the device. If the power supply should go off and come on again the alarm 10 will be energized until reset.

It will also be seen that care must be observed when the transformer T1 is connected so that phase polarity is correct between primary and secondary leads. It will also be seen that when placing the gas detector in service and the circuit is first energized the alarm 10 will be energized and will remain energized until the reset terminals 24 and 25 are closed and released so as to energize the relay 13 and place the control circuit through the transistor 21 in operation. If the alarm circuit 10 is energized after the reset is released and the relay 13 has actuated, the sensitivity adjustment R4 is adjusted to a point just above that where the alarm circuit 10 opens. It will be noted that the set of contacts 24 of the reset mechanism are shorted across the emitter electrode 22 and the collector electrode 23 of the transistor 21. This is arranged so that the bias of the transistor 21 does not have to be adjusted for the pull-in power of the relay 13 but only to a point above drop-out. It is known that the pull-in power of a relay is about one-third more than the hold-in power. The arrangement therefore makes the detector circuit more sensitive to the presence of combustible gases without an additional amplification.

It will further be noted that a silicon solar cell such as used in the gas detector herein disclosed at 19 will increase its voltage output with a corresponding temperature drop. It is also true that the light output of the platinum filament detector 18 is reduced with a decrease in ambient temperature. By matching these two characteristics, a stable and sensitive circuit is achieved under various temperature conditions.

It will thus be seen that a relatively simple and efficient gas detector has been disclosed which avoids the difficulties heretofore experienced with gas detectors including the dangers associated with the open-flame type and the inaccurate responses of the Wheatstone bridge type devices as known in the prior art.

The present invention operates efficiently when the temperature of the platinum filament in the detector 18 is well below danger levels when associated with combustible gases and the invention therefore meets the several objects of the invention, and having thus described my invention, what I claim is:

1. A gas detector for indicating the presence of a combustible gas comprising a source of current, a transformer in connection with said current source, a platinum filament, an alarm circuit and alarm device and a relay connected to said current source for controlling said alarm circuit, a transistor, a silicon solar cell electrically connected with the base electrode of said transistor, said filament being electrically connected with the emitter electrode of said transistor and the secondary of said transformer, said silicon solar cell being electrically connected with said secondary of said transformer, said relay electrically connected with said emitter electrode of said transistor and said collector electrode of said transistor connected with the primary of said transformer, said last named connection including a rectifier, said cell responsive in operation to increased radiation of said filament so as to generate voltage nullfying said bias voltage.

2. A gas detector for indicating the presence of a combustible gas in an atmosphere comprising in combination: a platinum filament exposed to said atmosphere, an alarm circuit and a relay controlling said alarm circuit, a power source for said alarm circuit, a step-down transformer having its primary connected to said power source a transistor and a silicon solar cell electrically connected with the base electrode of said transistor, said filament being electrically connected with the emitter electrode of said transistor and with the secondary of the step-down transformer, said silicon solar cell also connected with said secondary of said transformer, means for adjusting the voltage flow in said circuit connecting said circuit solar cell and said secondary of said transformer, said relay connected with said emitter electrode of said transistor, said collector electrode of said transistor connected with the primary of said transformer and including a rectifier in said last named connection, a condenser and a neon lamp in said circuit connecting said emitter electrode and rectifier with said power source, said cell responsive in action to the radiant energy output of said filament.

References Cited by the Examiner

UNITED STATES PATENTS

| | | | |
|---|---|---|---|
| 2,835,886 | 5/1958 | Boydanowski et al. | 340—228 |
| 3,041,590 | 6/1962 | Lucci | 340—237 |

NEIL C. READ, *Primary Examiner.*

R. M. ANGUS, *Assistant Examiner.*